United States Patent
Matsumoto et al.

(10) Patent No.: US 8,424,029 B2
(45) Date of Patent: Apr. 16, 2013

(54) OPTICAL DISC DEVICE

(75) Inventors: Koji Matsumoto, Tokyo (JP); Seiji Hamaie, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 227 days.

(21) Appl. No.: 13/005,596

(22) Filed: Jan. 13, 2011

(65) Prior Publication Data

US 2011/0185372 A1     Jul. 28, 2011

(30) Foreign Application Priority Data

Jan. 28, 2010   (JP) ................. 2010-016864

(51) Int. Cl.
*G11B 33/14*     (2006.01)
*G11B 33/08*     (2006.01)

(52) U.S. Cl.
USPC .......................................... 720/655

(58) Field of Classification Search ........... 720/655, 720/600
See application file for complete search history.

(56) References Cited

U.S. PATENT DOCUMENTS

2001/0005348 A1*   6/2001   Kazmierczak et al. ...... 369/75.1

FOREIGN PATENT DOCUMENTS

| JP | 2005-056526 | 3/2005 |
|---|---|---|
| JP | 2007-109327 | 4/2007 |

* cited by examiner

*Primary Examiner* — Julie Anne Watko
(74) *Attorney, Agent, or Firm* — Antonelli, Terry, Stout & Kraus, LLP.

(57) ABSTRACT

A housing included in an optical disc device 1 includes a top case 2 and a bottom case 3. The top case 2 includes a ceiling plate 2a and side plates 2b. The bottom case 3 includes a bottom plate 3a and side plates 3b. The top case 2 and the bottom case 3 are assembled and fixed to each other so that the side plates 2b of the top case are located on the outer sides of the side plates 3b of the bottom case. The top case is formed with a groove 2d and flat portions 2e on an inner-side end portion of the ceiling plate 2a of the top case, the groove 2d and flat portions 2e extending along bent portions 2c of the side plates 2b of the top case. The flat portions shield the groove 2d.

4 Claims, 3 Drawing Sheets

OPTICAL DISC DEVICE

CLAIM OF PRIORITY

The present application claims priority from Japanese patent application serial No. JP 2010-016864, filed on Jan. 28, 2010, the content of which is hereby incorporated by reference into this application.

BACKGROUND OF THE INVENTION (1) Field of the Invention

The present invention relates to an optical disc device that records and reproduces information on and from an optical disc, and more particularly to a structure of a housing that stores a tray carrying an optical disc.

(2) Description of the Related Art

In general, an optical disc device that is installed in an electronic device has a tray that is held by a body (housing) of the optical disc device and can be inserted into and ejected from the body (housing) of the optical disc device. While the tray is ejected from the housing, an optical disc is placed on the tray. Then, the tray is inserted into the housing so that the optical disc is stored in the body of the optical disc device. A spindle motor and an optical pickup are attached to the tray. The spindle motor rotates the optical disc. The optical pickup can move in a radial direction of the optical disc. The optical pickup irradiates a recording surface of the optical disc with a laser beam so that information is recorded on or reproduced from the recording surface.

The housing stores the tray that can be inserted into and ejected from the housing. The housing includes a top cover and a bottom cover. For a slim type optical disc device, a light material such as a thin aluminum plate is used as a material of a housing in order to reduce the thickness and weight of the slim type optical disc device. However, the mechanical intensity of the housing is low, and a vibration or a contact sound (chattering sound) may occur due to a small gap between the top cover and the bottom cover during rotation of a disc. In order to prevent such a vibration and contact sound, the following structures have been proposed.

JP-A-2005-56526 discloses a structure in which a spacer that includes at least one of a conductive material and a soft magnetic material is located between and faces an upper cover (top cover) and a lower cover (bottom cover) included in a housing so as to prevent a contact sound and improve an effect to shield a magnetic wave that comes from the housing.

JP-A-2007-109327 discloses a structure in which projecting portions are provided at facing parts of side portions of first and second housing portions (bottom and top covers) so as to prevent a vibration between the housing portions. This structure disclosed in JP-A-2007-109327 prevents a reduction in productivity even when the weight of an optical disc device is reduced.

SUMMARY OF THE INVENTION

In particular, the thicknesses of optical disc devices that are installed in laptop computers and the like are in a range of 9.5 to 12.7 mm, for example. The thicknesses of optical disc devices tend to be reduced. In addition, there is a demand for an optical disc device that has a reduced weight. Thus, a material that has a small thickness is used as an exterior part of the optical disc device. When a load is applied to a housing from outside the housing, the housing (including a top case and a bottom case) may easily warp. When the load is large, end portions of side plates of the bottom case may be inserted into grooves of the top case, and a sound (hereinafter referred to as unusual sound) may occur due to galling. The grooves of the top case are provided at boundaries between a ceiling plate and side plates of the top case to set an appropriate angle between each of the side plates and the ceiling plate with high accuracy. Normally, the end portions of the side plates of the bottom case are not inserted into the grooves of the top case. However, when an excessive load is applied to the housing, any of the end portions of the side plates of the bottom case may be inserted into any of the grooves of the top case, and an unusual sound that is uncomfortable for a user may occur.

Such an unusual sound caused by an insertion of a constituent part of the housing has not been treated as a problem. JP-A-2005-56526 and JP-A-2007-109327 describe a chattering sound and the contact sound that occur due to a gap between the top case and the bottom case during rotation of a disc. The chattering sound and the contact sound are different from an unusual sound that is caused by an insertion of a part of a bottom case into a part of a top case and is a problem solved by the present invention.

An object of the present invention is to provide an optical disc device that prevents an unusual sound from occurring due to an insertion of a part of a bottom case into a part of a top case when a load is applied to a housing.

According to the present invention, an optical disc device stores, in a housing, a tray carrying an optical disc, and records and reproduces information on and from the optical disc, wherein the housing includes a top case having a ceiling plate and side plates, and a bottom case having a bottom plate and side plates, the top case and the bottom case being assembled and fixed to each other in such a manner that the side plates of the top case are located on the outer sides of the side plates of the bottom case, and wherein the top case is formed with a groove and flat portions shielding the groove on an inner-side end portion of the ceiling plate of the top case, the groove and flat portions extending along bent portions of the side plates of the top case.

It is preferable that the top case have a plurality of flat portions that are provided for each of the bent portions and separated from each other. In addition, it is preferable that the flat portions and the groove are integrally formed.

According to the present invention, when a load is applied to the housing, it is possible to prevent a part of the bottom case from being inserted into a part of the top case, thereby prevent an unusual sound, and avoid giving an uncomfortable feeling to a user.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

An embodiment of the present invention is described below with reference to the accompanying drawings.

Figure 1:
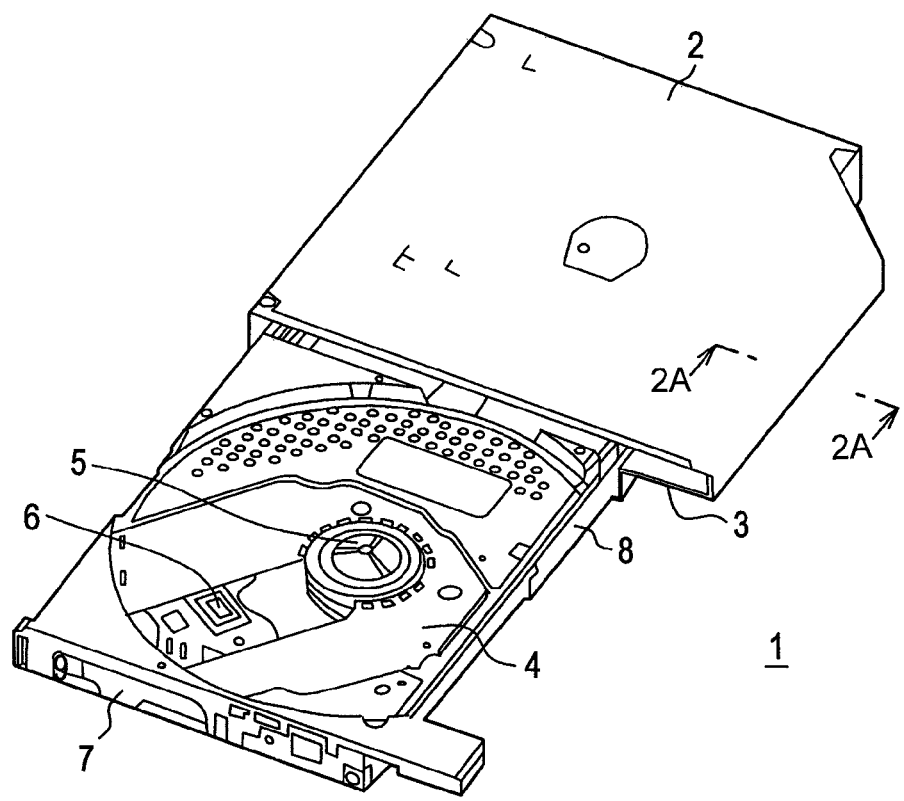
FIG. 1 is a perspective view of the appearance of an optical disc device according to an embodiment of the present invention.

FIG. 1 is a perspective view of the appearance of an optical disc device according to the embodiment of the present invention. As shown in FIG. 1, reference numeral 1 indicates an optical disc device; reference numeral 2 indicates a top case; reference numeral 3 indicates a bottom case; reference numeral 4 indicates a tray; reference numeral 5 indicates a spindle motor; reference numeral 6 indicates an optical pickup; reference numeral 7 indicates a bezel; and reference numeral 8 indicates a rail.

The optical disc device 1 includes a housing including the top case 2 and the bottom case 3, and the tray 4. The tray 4 is held so as to be inserted into and ejected from the housing. The spindle motor 5 and the optical pickup 6 are attached to the tray 4. The spindle motor 5 drives and rotates an optical disc. The optical pickup 6 irradiates the optical disc with a laser beam so that information is recorded on or reproduced from the optical disc.

The tray 4 can move and be inserted into and ejected from the housing (including the top case 2 and the bottom case 3) through the rail 8. A rail guide that is attached to the bottom case 3 is held between the bottom case 3 and the rail 8. A rail holding section that is attached to a side surface of the tray 4 is held between the tray 4 and rail 8. In order to store the tray 4 in the housing, the bezel 7 that is provided on a front surface of the tray 4 is pressed toward the housing, and then the tray 4 is engaged with an engagement portion that is included in the housing. In this manner, the tray 4 is stored in and fixed to the housing. In order to eject the tray 4 from the housing, an eject button that is provided on the bezel 7 is pressed and whereby the engagement of the tray 4 with the housing is released. In this manner, the tray 4 moves toward the front side of the housing and is ejected from the housing.

Figure 2:
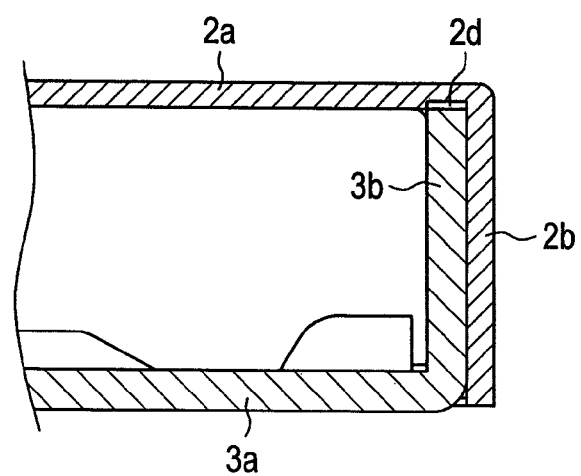
FIG. 2 is a cross sectional view of a housing taken along a line 2A-2A of FIG. 1.

FIG. 2 is a cross sectional view of the housing taken along a line A-A of FIG. 1 and shows an assembled structure that includes the top case 2 and the bottom case 3. The top case 2 has a flat ceiling plate 2a and side plates 2b. The side plates 2b are formed by folding side portions of the top case 2 so that an angle between each of the side portions and the ceiling plate 2a is a substantially right angle. The side plates 2b extend downward. The top case 2 further has a groove 2d that is located on an inner-side end portion of the ceiling plate 2a of the top case 2 and extends along bent portions of the side plates 2b. The groove 2d is provided to set an appropriate angle between each of the side plates 2b and the ceiling plate 2a with high accuracy during a process of folding the side portions of the top case 2 and forming the side plates 2b. The bottom case 3 has a flat bottom plate 3a and side plates 3b. The side plates 3b are formed by folding side portions of the bottom case 3 so that an angle between each of the side portions and the bottom plate 3a is a substantially right angle. The side plates 3b extend upward.

The top case 2 and the bottom case 3 are fixed to each other using an engagement member (not shown) or a screw (not shown) so that the side plates 2b of the top case 2 are located on the outer sides of the side plates 3b of the bottom case 3 and cover the side plates 3b of the bottom case 3. In this state, end portions of the side plates 3b of the bottom case 3 are not inserted into the groove 2d of the top case 2.

Figure 3A:
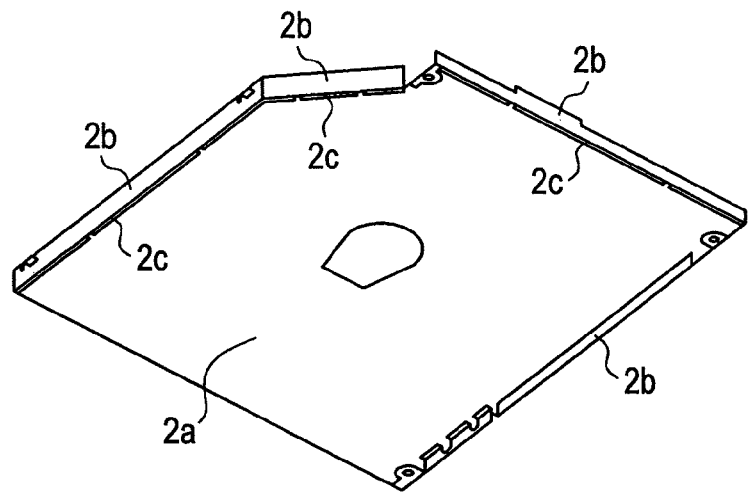
FIG. 3A is a perspective view showing a back surface of a top case according to the embodiment.
Figure 3B:
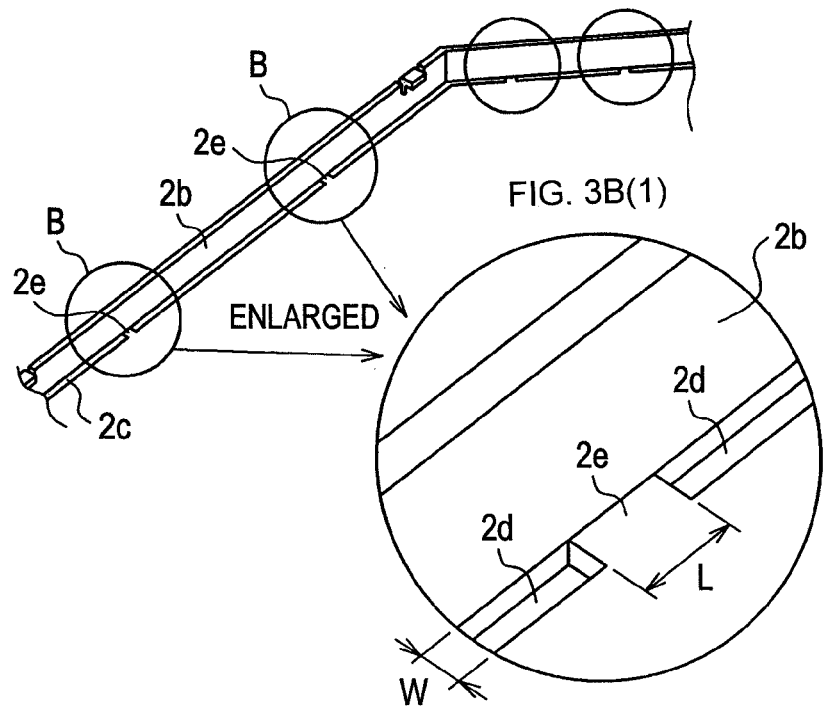
FIG. 3B is a partially enlarged view of the back surface of the top case and shows a flat portion provided in a groove in enlarged view in FIG. 3B(1)

FIG. 3A is a perspective view of a back surface of the top case 2 according to the present embodiment. FIG. 3B is a partially enlarged view of the back surface of the top case 2.

As shown in FIG. 3A, the top case 2 has the ceiling plate 2a and the side plates 2b. The side plates 2b are formed by folding the side portions of the top case 2 so that an angle between each of the side portions and the ceiling plate 2a is a substantially right angle. The side plates 2b are located at end portions of the ceiling plate 2a, while a side plate 2b is not present at an end portion of the ceiling plate 2a on the side on which the tray is inserted and ejected. In FIG. 3A, reference numeral 2c indicates bent portions of the side plates 2b. The bent portions 2c extend from the ceiling plate 2a of the top case 2. The groove 2d is located on the bent portions 2c.

FIG. 3B is an enlarged view of the bent portion 2c. The groove 2d is located on the bent portions 2c. In the present embodiment, a flat portion 2e is present between ends of each of the bent portions 2c and shields the groove 2d. The flat portions 2e are located in the middle (indicated by B in FIG. 3B) of the bent portions 2c and portions B shown in enlarged view in FIG. 3B(1). The flat portions 2e serve as stoppers so as to prevent end portions of the side plates 3b of the bottom case 3 from being inserted into the groove 2d. In other words, since the flat portions 2e each shield the continuous groove 2d, the end portions of the side plates 3b of the bottom case 3 cannot be inserted into the groove 2d. Two or more flat portions 2e that are separated from each other may be provided for each of the bent portions 2c. In this case, it is possible to prevent the end portions of the side plates 3b of the bottom case 3 from being inserted into the groove 2d in a stable manner.

The dimensions of the top case 2 are described below. The thickness of the top case 2 is 0.5 mm. The width W of the groove 2d is in a range of 0.5 mm to 1 mm. The depth of the groove 2d is in a range of 0.05 mm to 0.1 mm. The lengths of the flat portions 2e are in a range of 1 mm to 2 mm. It is preferable that the heights of the flat portions 2e be equal to the height of the ceiling plate 2a. However, the heights of the flat portions 2e may be slightly different from that of the ceiling plate 2a.

The top case 2 is formed as follows. First, an unnecessary portion of a thin plate made of aluminum or the like is removed by cutting so that the plate has a predetermined outer shape. Then, the plate is processed using a die. Then, side portions of the plate are folded in a folding process. Since the groove 2d is formed before the folding process, the side portions of the plate can be folded so that an angle between each of the side portions of the plate and the ceiling portion of the plate is a substantially right angle. When the shape of the die is changed, the groove 2d and the flat portions 2e can be integrally formed using the die. For example, when the die is used which has a projecting portion that is not continuous and is provided for formation of the groove, the flat portions 2e are formed at regions that correspond to discontinuous parts of the projecting portion of the die. The lengths of the flat portions 2e are extremely smaller than the length of the groove 2d. Thus, the accuracy of setting the angles between the side plates 2b and the ceiling plate 2a is not reduced. In this manner, the top case 2 can be easily formed without using additional parts in the present embodiment.

Figure 4A:
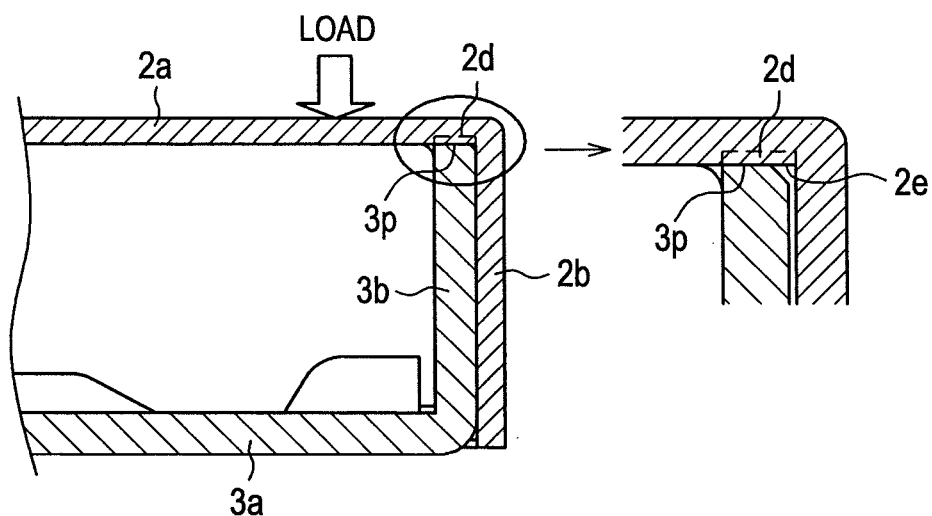
FIG. 4A is a diagram showing an engagement of the top case with a bottom case when a load is applied to the housing in the embodiment and FIG. 4A(1) shows an enlarged view of the circled portion of FIG. 4A.
Figure 4B:
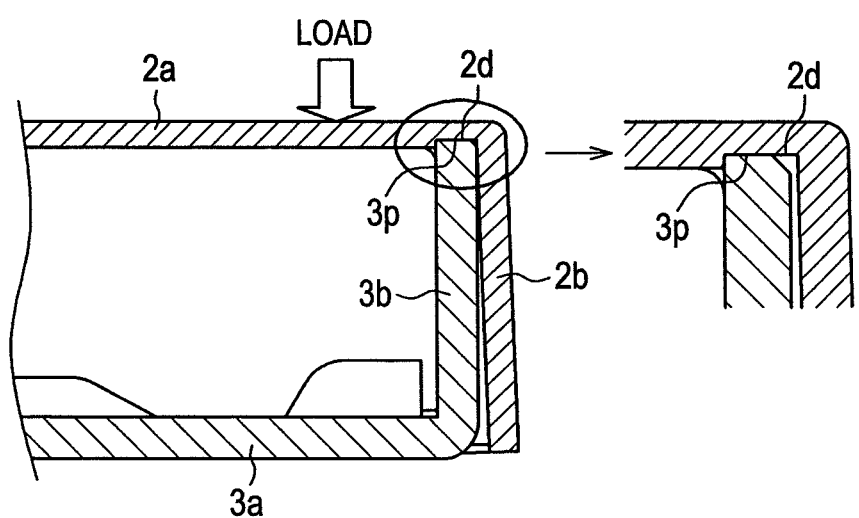
FIG. 4B is a diagram showing an engagement of a top case with a bottom case when a load is applied to the housing in a conventional structure and FIG. 4B(1) shows an enlarged view of the circle portion of FIG. 4B.

FIGS. 4A, 4A(1) and 4B, 4B(1) are diagrams showing an effect to prevent a part of the bottom case from being inserted into a part of the top case according to the present embodiment. FIG. 4A shows an engagement of the top case with the bottom case when a load is applied to the housing in the present embodiment and FIG. 4A(1) shows an enlarged view of the circled portion of FIG. 4A. FIG. 4B shows an engagement of a top case with a bottom case when a load is applied to the housing in a conventional structure for comparison and FIG. 4B(1) shown an enlarged view of the circle portion of FIG. 4B.

First, an insertion of a part of a housing in the conventional structure is described below with reference to FIG. 4B and FIG 4B(1). A top case 2 and a bottom case 3 are fixed to each other using an engagement member or a screw in the conventional structure. Normally, end portions 3p of side plates 3b of the bottom case 3 are not inserted into a groove 2d of the top case 2 in the conventional structure. However, when a large load is applied to the housing in a vertical direction, at least one or both of the top case 2 and the bottom case 3 may warp and be deformed, and any of the end portions 3p of the side plates 3b of the bottom case 3 may be inserted into the groove 2d of the top case 2 in the conventional structure. In this case, galling occurs between the end portion 3p and the groove 2d and whereby an unusual sound occurs in the conventional structure. Even when the width of the groove 2d is smaller than the thickness of the side plate 3b of the bottom case 3, the end portion 3p of the side plate 3b of the bottom case 3 may push the side plate 2b of the top case 2 toward the outside of the housing and be inserted into the groove 2d in the conventional structure. Thus, it is difficult to prevent the end portions 3p of the side plates 3b of the bottom case 3 from being inserted into the groove 2d of the top case 2 in the conventional structure.

In the present embodiment shown in FIG. 4A and FIG. 4A(1), even when a large load is applied to the housing, the flat portions 2e that is located in the middle of the groove 2d serve as stoppers, and the end portions 3p of the side plates 3b of the bottom case 3 are not inserted into the groove 2d. Even when at least one or both of the top case 2 and the bottom case 3 warp and are deformed, the flat portions 2e prevent the end portions 3p from being inserted into the groove 2d. Thus, galling does not occur between the end portions 3p and the groove 2d, and an unusual sound does not occur due to galling.

As described above, in the present embodiment, even when a load is applied to the housing, it is possible to prevent the end portions of the side plates of the bottom case from being inserted into the groove of the top case due to deformation of at least one or both of the top and bottom cases in the simple structure in which the flat portions are located in the middle of the groove of the top case. As a result, it is possible to prevent a part of the bottom case from being inserted into a part of the top case, thereby prevent an unusual sound, and avoid giving an uncomfortable feeling to a user.

While we have shown and described the embodiment in accordance with our invention, it should be understood that the disclosed embodiment is susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc device that stores, in a housing, a tray carrying an optical disc, and records and reproduces information on and from the optical disc,
    wherein the housing includes a top case having a ceiling plate and side plates, and a bottom case having a bottom plate and side plates, the top case and the bottom case being assembled and fixed to each other in such a manner that the side plates of the top case are located on the outer sides of the side plates of the bottom case, and
    wherein the top case is formed with a groove and flat portions shielding the groove on an inner-side end portion of the ceiling plate of the top case, the groove and flat portions extending along bent portions of the side plates of the top case.

2. The optical disc device according to claim 1,
    wherein the top case has a plurality of flat portions that are provided for each of the bent portions and separated from each other.

3. The optical disc device according to claim 1,
    wherein the flat portions and the groove are integrally formed.

4. An optical disc device that stores, in a housing, a tray carrying an optical disc, and records and reproduces information on and from the optical disc,
    wherein the housing includes a top case having a ceiling plate and side plates, and a bottom case having a bottom plate and side plates, the top case and the bottom case being arranged in such a manner that end portions of the side plates of the bottom case are in contact with an inner-side end portion of the ceiling plate of the top case, and
    wherein the top case is formed with a groove and flat portions on the inner-side end portion of the ceiling plate of the top case, the groove being formed when the side plates of the top case are formed by folding side portions of the top case, the flat portions preventing the end portions of the side plates of the bottom case from being inserted into the groove when a load is applied to the housing.

* * * * *